June 15, 1926.　　　R. OPPENHEIM　　　1,588,608

GALVANIC BATTERY

Filed May 20, 1924

Inventor
R. Oppenheim
By Marks & Clerk
attys.

Patented June 15, 1926.

1,588,608

UNITED STATES PATENT OFFICE.

RENÉ OPPENHEIM, OF LEVALLOIS-PERRET, FRANCE, ASSIGNOR TO SOCIETE ANONYME LE CARBONE, OF LEVALLOIS-PERRET, FRANCE.

GALVANIC BATTERY.

Application filed May 20, 1924, Serial No. 714,711, and in France April 10, 1924.

The so-called "gas" battery accumulators, that is to say accumulators for the energy of the ionized gases, present as is well known, various advantages, the chief of them being that their weight in relation to the available quantities of energy is low in comparison with that of lead accumulators for example, their formation is very rapid, and their conditions of charge and discharge afford a wide range of utility.

This type of accumulator has up to the present however the disadvantage of an insufficient output because of the accumulation of the gases which takes place in the centre of the electrolyte and the output is thus restricted by the degree of solubility of these gases in the electrolyte.

Now the object of the present invention is a manner of forming gas accumulators which, besides the qualities of the present gas accumulators, possess the advantage of having a large output.

The gas battery or accumulator of this invention is essentially characterized by the fact that it comprises a medium of great absorbing power in a small volume storing up the gases which originate from the charge and restoring them at the time of the discharge.

The invention consists in principle of the use of electrodes capable of absorbing the gases and, constituted, for this purpose, of a porous body and a good conductor of electricity possessing a high absorbent power, and protected over the whole of its surface by a coating impermeable by liquids and permeable by gases.

This porous body, due to its special constitution, can concentrate during charging under a low pressure a considerable quantity of gas, which it retains as long as the circuit remains open and only restores it at the moment of the discharge.

The following advantages are the result of this:

(a) The possibility of accumulating, with a small pressure, a large quantity of energy, this later being in proportion to the weight of the gas liberated.

(b) Work practically null with an open circuit.

(c) A practically perfect output when the gas or gases is or are again liberated so as to reconstitute the electrolyte.

In the present type of storage battery (accumulator) the porous electrode forming the chief feature of the invention is formed by a block of porous carbon or a cake of charcoal coated on one surface with a film or skin impermeable by liquids and permeable by gases and formed, for instance, by a pectized colloid. In the case where the electrolyte decomposes into two gaseous elements, the anode and the cathode are each formed by an electrode composed in this manner. If, on the contrary, the electrolyte decomposes into a metal and a gas, the anode only presents the special constitution indicated above and the cathode is, for example, a metal plate or rod of the same metal as that forming the basis of the electrolyte. In both cases the electrolyte may be in liquid solution or may be immobilized by the processes known by means of gelatine, glass wool, pumice stone in powdered form, sawdust or the like.

In order to show these ideas, two methods of using the invention are described hereinafter by way of example, with reference to the accompanying drawing, in which:—

Figure 1:
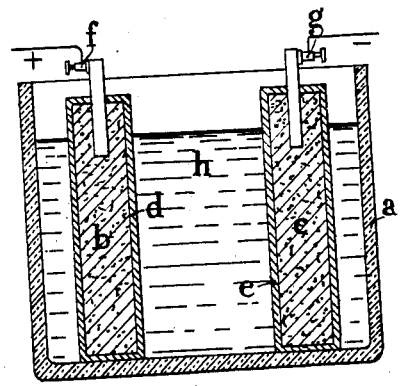
Fig. 1 is a vertical section of an embodiment applicable in the case in which the electrolyte is decomposed in two gaseous elements.

The apparatus as shown in Fig. 1 comprises a receptacle $a$ of insulating material which is not attacked by the electrolyte, say glass for example; in this receptacle there are placed two blocks $b$, $c$ of any shape, say parallelepipedic for example, each formed by a block of charcoal the whole surface of which is covered by a pectized colloidal film $d$, $e$ formed, for example, by a coating of oleo-margarate of zinc.

These two blocks $b$, $c$, which constitute respectively the anode and the cathode, are each provided at their upper part with a terminal $f$ $g$.

The electrolyte $h$, contained in the receptacle $a$, and into which the two electrodes $b$, $c$, penetrate, is formed, for example, of a concentrated solution of ammonium chloride.

In the course of the charging the ammonium chloride is decomposed, and the chlorine goes to the anode $b$, the ammonia to the cathode $c$ and the hydrogen is released.

Due to the great adsorbing power of the two electrodes $b$, $c$, the chlorine and the ammonia are absorbed by these latter. In the course of the discharge the chlorine and the ammonia are again combined so as to form ammonium chloride according to the formula:

$$3Cl + 4NH^3 = 3NH^4Cl + N:$$

the atom of liberated nitrogen disengages itself.

Figure 2:
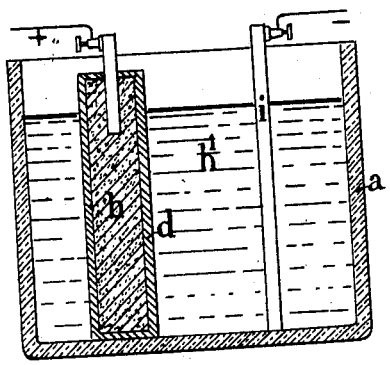
Fig. 2 shows, also in vertical section, a modification to be used in the case in which the electrolyte decomposes in a gas and a metal.

Figure 2 shows a manner of carrying out the invention applicable to the case where the electrolyte used decomposes into a metal and a gas.

In this case the anode is formed of a porous electrode $b$ provided with a pectized colloidal coating $d$, as in the preceding case; the cathode, on the contrary is formed by a metal plate or rod $i$, say of zinc for example, and the electrolyte $h^1$ is a solution of chloride of zinc.

In the course of the charging the zinc, released by the electrolyte, is deposited upon the zinc cathode $i$, and the chlorine is absorbed by the porous mass $b$ forming the anode.

At the time of the discharge this chlorine is restored by the porous anode $b$ and dissolves the zinc deposited upon the cathode $i$.

In the two applications of the invention described above, the electrolyte may be in the state of a free liquid, or it may be immobilized by the means already known, such as gelatine, glass wool, powdered pumicestone, sawdust or the like.

It is to be understood that the methods of application hereinbefore set forth are only given by way of example, and that the form, sizes, nature of the materials employed and the structural details may vary according to the different applications of the invention.

Claims:—

1. A gas accumulator characterized by the fact that it comprises at one of its poles, a porous electrode covered over its whole surface with a coating impermeable by liquids and permeable by gases.

2. A gas accumulator characterized by the fact that it comprises, at each of its poles, a porous electrode covered over its entire surface with a coating impermeable by liquids and permeable by gases.

3. A gas accumulator comprising an anode constituted by a block of porous carbon, covered by a pectized colloidal coating, and a cathode constituted by a conductive element.

4. A gas accumulator characterized by the fact that the anode and the cathode are each constituted by a block of porous carbon, charcoal for instance, and that a coating, formed of a pectized colloid, covers the said porous block.

5. A gas accumulator characterized by the fact that the anode and the cathode are each constituted by an agglomerate of charcoal, that this agglomerate is covered over its whole surface with a pectized film of oleomargarate of zinc, and that the electrolyte is a concentrated solution of ammonium chloride.

The foregoing specification of my "Improvements in or relating to galvanic batteries" signed by me this 6th day of May 1924.

RENÉ OPPENHEIM.